UNITED STATES PATENT OFFICE 2,121,038

INSECTICIDAL COMPOSITIONS

Lindley E. Mills, Midland, Mich., assignor to The Dow Chemical Company, Midland, Mich., a corporation of Michigan No Drawing. Application November 29, 1935, Serial No. 52,069

8 Claims. (Cl. 167—43)

This invention relates to insecticidal compositions comprising a petroleum distillate; and, more particularly, to an improved insecticidal agent containing a petroleum distillate and a relatively small amount of a mono-substituted dinitrophenol. The term "mono-substituted dinitrophenol" as herein used includes all compounds having the following formula:

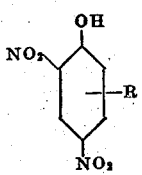

wherein R represents a substituting hydrocarbon radical containing two or more carbon atoms, selected from the class consisting of the alkyl, aralkyl, and cycloalkyl radicals, e. g., ethyl, butyl, normal hexyl, benzyl, cyclohexyl, etc.

Among the objects of my invention is the provision of an insecticidal composition which is (1) non-injurious to growing plants when applied thereto at the concentrations necessary for the control of insects thereon; (2) more toxic to insect life than are the known insecticidal compositions comprising oil as the effective agent, so that they may be applied to plants at concentrations of toxic material much lower than those ordinarily recommended; (3) capable of controlling pest infestation at sufficiently low concentrations to allow the inclusion of crude and comparatively inexpensive petroleum distillates containing up to as much as 50 per cent by weight of unsaturated hydrocarbons therein without injury to plants treated therewith; and, (4) substantially non-toxic to domestic animals and human beings.

The effectiveness of petroleum oils as a toxic agent in insecticidal materials has long been recognized. They have, however, been subject to certain disadvantages in actual use, the chief of which is their well known tendency to injure foliage and to depress the metabolism of plants when applied thereto in the concentrations required to kill insects, their eggs, and larvae. Inasmuch as the plant-injuring tendency of petroleum oils has been believed to be directly proportional to their unsaturated hydrocarbon content, it has been common in practice to limit the choice of oils for insecticidal use to those substantially free from such unsaturated ingredients. Refined non-volatile petroleum fractions, which have been recommended as safe for use, are stated to be those containing not more than 15 per cent of unsaturated hydrocarbons, as determined by the sulphonation test described in Bureau of Mines Technical Paper 181.

Although these oils are stated to be non-toxic, chemically inert and non-injurious to plants, extensive research has not substantiated these claims, and it has been found that non-volatile oils, regardless of their purity, actually do produce serious physiological disturbances in healthy plants when used in sufficient strength to control insect pests, apparently because the non-volatile oil, adhering upon the leaf, interferes with transpiration, and also is absorbed more or less into the active circulation of the plant, causing metabolic disturbances. Attempts have been made to prevent plant injury by regulating oil viscosities, gravities, volatilities, concentrations, and the degree of refinement, but all of these attempts have failed to eliminate the danger of plant injury. Volatile oils, such as kerosene, when used in spray emulsions, are not effective in small concentrations because they vaporize too rapidly, while if used in larger concentrations they cause leaf burn and other plant injuries. For a time it was thought that highly purified viscous oils, such as white oils, could be used with safety on foliage, but it was found that much of the deleterious action of oil on foliage was physical rather than chemical and that the per cent of unsulphonatable residue in the oil was not a reliable measure of its safety for use as an insecticide.

Oil-in-water emulsions have been used as dormant sprays for San Jose scale, red mite, and leaf hopper. For use against aphids, however, concentrations up to 6 and 8 per cent of oil in the applied emulsions have failed to give any effective control, and at such concentrations twig kill, bud kill, and general retardation of the tree development has been widely reported.

Summer application of oil emulsions for codling moth control has been found to cause reduction in size, faulty coloring, and premature drop of fruit, as well as defoliation of the growing tree.

The relatively high concentrations of such emulsions required to effect a satisfactory insect control are detrimental to the quality and quantity of the harvested fruit and injurious to the tree.

Insecticidal oils have been combined with anti-penetrating agents and miscible organic derivatives calculated to reduce the absorption of oil by the leaf, and to vary the rate of evaporation of the oil film. Such remedial procedures increase the ultimate cost of pest control without appreciably increasing the effectiveness of the insecticidal composition or reducing its injuriousness to plants.

The mono-substituted dinitrophenols are known to have insecticidal properties, but when applied to plants as dusts or aqueous suspensions in the amounts necessary for satisfactory insect control, they also cause severe injury with defoliation, retardation of normal development, and metabolic disturbances.

Although mono-substituted dinitrophenols and petroleum oils each damage plants to such an extent that they cannot individually be applied as a general insecticidal spray in dosage sufficient to control insects without danger of serious injury to the plant itself, I have discovered that by dissolving mono-substituted dinitrophenols in petroleum distillates there are obtained compositions possessing insecticidal properties which are far greater than the additive insecticidal properties of their components, and that these compositions may be applied safely to plants in amounts sufficient for effective insect control without danger of injury to the plant. I have further found that the reduced amounts of such compositions required to control insects efficiently permit the employment of partially refined petroleum distillates containing up to 50 per cent by weight of sulphonatable constituents as a component in such compositions without injuring the trees or plants to which the insecticide may be applied. My invention, accordingly, provides insecticidal compositions wherein cruder and less expensive distillates may be employed than have previously been considered suitable for inclusion in plant insecticides of the oil emulsion type.

My new products are generally prepared by dissolving, or otherwise dispersing, a mono-substituted dinitrophenol, e. g. 2.4-dinitro-6-tertiary-butyl-phenol, 2.4-dinitro-6-octyl-phenol, 2.4-dinitro-6-cyclohexyl-phenol, 2.4-dinitro-metacyclohexyl-phenol, etc., or mixtures of such phenols, in a petroleum distillate. I generally prefer to make a solution or suspension containing between about 0.075 and 10 per cent by weight of the mono-substituted dinitrophenol in the distillate, but any suitable concentrations of this material in petroleum distillate are included within the scope of my invention.

I find that such an insecticidal composition may be applied to plants in a variety of ways and for a variety of purposes. I may apply such distillate-toxic solution directly to an insect-infested tree or plant, as a mist or fog, or it may be diluted with water and applied in spray form as an oil-water emulsion, in which case spreading and emulsifying agents such as casein, metallic caseinates, blood albumin, naphthenates, etc., are preferably incorporated therewith. My new solutions may be applied to plants or trees in any strength not causing plant injury and burning, but I generally prefer to apply them in the form of an oil-in-water suspension containing between about 0.10 and about 5.0 per cent by weight of the distillate-phenol mixture. The optimum concentration of effective agent in the suspension varies with both the concentration of mono-substituted dinitrophenol in the oil, and the particular purpose for which the agent is being applied.

My new insecticidal compositions may be used as either dormant or summer sprays, change being made in the type of distillate used, and in the concentration of the toxic principle employed therein, as required. Inasmuch as these new materials function as both contact and stomach poisons, they may be applied as ovicides, aphicides, larvicides, or scalicides with equally effective results.

I have found in using the herein-described mixtures of petroleum distillates and mono-substituted dinitrophenols that the function of each component is complementary to that of the other, which fact undoubtedly explains the greater than additive results which have been obtained. This unpredictable increase in toxicity, by enabling the control of pest infestation with smaller amounts of my new insecticidal mixtures, avoids the high concentrations of distillate and/or other toxic principle on the leaves, blossoms, fruit, or bark which have previously caused plant injury. It is this great reduction in the concentration of insecticidal material deposited on the tree or plant which enables me safely to utilize less refined oils and oils of higher unsaturated hydrocarbon content than were previously thought practical for such use.

The relatively non-poisonous character of these new compositions, as compared to sprays containing derivatives of lead, arsenic, mercury, cyanide, etc., constitutes a decided advantage in the use of the same. The comparatively non-poisonous character of the mono-substituted dinitrophenols, the low concentrations of the mono-substituted dinitrophenols generally included in the oil, and the low concentration of the oil emulsions required for insect control, substantially eliminate occupational hazards in spraying. Washing and scrubbing of sprayed fruit before marketing, as is at present generally required, is in most cases obviated. Such minute traces of oily spray residue as may be left on the fruit at time of marketing are substantially non-toxic to humans.

The following table shows the approximate limits within which I have found that the percentages by weight of materials may be varied as they appear in the finished emulsion ready for application to plants:

|  | Percent by weight |
| --- | --- |
| A petroleum distillate containing at least 50 per cent by weight of unsulphonatable residue | 0.10 — 5.0 |
| A mono-substituted dinitrophenol | 0.001— 0.2 |
| An emulsifying agent | 0.005— 0.8 |
| Water | 99.894— 94.0 |
|  | 100.000  100.0 |

The following examples show in detail a number of ways in which I carry out my invention in preparing my oily insecticides and testing the same, and illustrate the results obtained thereby, but are not to be construed as limiting my invention:

*Example I*

5 pounds of 2.4-dinitro-6-cyclohexyl-phenol were dissolved in 70 pounds of lubricating oil having an unsulphonatable residue of 82 per cent, a Saybolt viscosity of 99–100 seconds, and a boiling range of 606°–742° F. This solution was emulsified with 2 pounds of sodium caseinate, previously dissolved in 23 pounds of water, to prepare a mixture which will hereafter be referred to as the stock emulsion.

The stock emulsion was diluted with varying amounts of water and applied to apple, cherry, pear, and peach trees as a dormant spray. Concentrations of 1 to 2 per cent of distillate-toxic in the diluted spray gave control against aphid and scale infestation comparable to that obtained with lime sulphur-nicotine sulphate mixture at concentrations usually recommended for delayed-dormant application. Periodical examination of the sprayed plots throughout the growing season showed no injury attributable to the spray application. Examination of ripened fruit from trees sprayed with my diluted stock emulsion showed substantially no aphid injury, while fruit from unsprayed control trees was seriously damaged.

An emulsion was prepared as above, containing only the previously described lubricating oil. Practically no aphid control was accomplished by use of this material at the same dilutions as found satisfactory with the distillate-toxic emulsion. At concentrations high enough to accomplish control, severe bud and twig injury was observed. These results were manifestly unsatisfactory as compared to those obtained with the diluted emulsion containing the substituted dinitrophenol as well as the oil.

Due to the non-adhering nature of the 2.4-dinitro-6-cyclohexyl-phenol, it was found impractical to conduct field tests with this material alone. Laboratory results, however, indicated that the high concentration of 2.4-dinitro-6-cyclohexyl-phenol required to effect a satisfactory pest control would be expected to give excessive bud and blossom injury.

Example II 3.0 pounds of 2.4-dinitro-6-cyclohexyl-phenol were dissolved in 97.0 pounds of the lubricating oil described in Example I. This distillate-toxic solution, in diluted and emulsified form, was tested in the field as a dormant spray for the control of aphid and scale infestation in concentrations ranging from 0.8 to 3.3 per cent by weight of the applied spray mixture.

For example, in preparing a spray containing 1.7 per cent of the distillate-toxic, 1.7 parts by weight of stock solution were vigorously agitated in the sprayer tank with 98.3 parts by weight of an approximately 0.005 per cent dispersion of blood albumin spreader in water, until a homogeneous suspension was produced. The resulting quick-breaking emulsion was fairly unstable and was agitated continuously in the spray tank while being applied to the test trees as a fine mist. Aphid control was approximately 100 per cent and no appreciable injury to the treated trees during the balance of the growing season was reported.

Concentrations of distillate-toxic as low as 0.8 per cent in the applied mixture gave between 85 and 95 per cent aphid control, but a concentration as high as 3.3 per cent caused some twig destruction and bud injury. The percentage aphid control, as given above, was calculated by comparison of the number of aphid-infested tips and spurs observed on treated and control trees after their complete foliation.

Example III 3.0 pounds of 2.4-dinitro-6-cyclohexyl-phenol were dissolved in 74.0 pounds of the lubricating oil described in Example I. The resultant distillate-toxic solution was thoroughly mixed with 3 pounds of oleic acid and 20 pounds of a "soluble base oil" to form a "miscible oil emulsion" capable of being mixed with water in any proportion. The "soluble base oil" component of the above composition comprised a mixture of naphthenic acids, various naphthenates, and high boiling petroleum by-products.

The above "miscible oil emulsion" was diluted with water to give spray solutions containing from about 0.8 to about 3.3 per cent by weight of petroleum distillate-toxic, and these mixtures were applied to apple trees as a dormant spray for the control of aphids and scale.

For example, in preparing a suspension containing 1.7 per cent by weight of distillate-toxic, a mixture of 2.2 pounds of the "miscible oil emulsion" and 97.8 pounds of water was vigorously agitated in the spray tank until a substantially homogeneous dispersion resulted. No further agitation of this diluted mixture was required during application to the test trees. Substantially complete control of aphid infestation was accomplished, and no twig kill or other injury was shown by the sprayed trees.

At a concentration of 0.8 per cent of distillate-toxic in the applied spray material 90–95 per cent control of aphid infestation was still obtained. As high a concentration as 3.3 per cent of the distillate-toxic did not cause appreciable tree injury. The per cent aphid control was again determined by comparison of infested tips and spurs of the treated and control trees following leaf and blossom development.

Example IV 0.5 pound of 2.4-dinitro-6-cyclohexyl-phenol was dissolved in 74.5 pounds of a lubricating oil having an unsulphonatable residue of 77 per cent by weight, a Saybolt viscosity of 76 seconds, and a boiling range of 560°–760° F. This solution was emulsified with a previously prepared solution of 2 pounds of sodium caseinate in 23 pounds of water to prepare a stock emulsion.

2.77 pounds of this stock emulsion were diluted with 100 gallons of water to form a spray containing 0.25 per cent of the distillate—2.4-dinitro-6-cyclohexyl-phenol solution. This spray was applied to Baldwin apple trees as a summer spray for the control of both first and second brood codling moth. Other trees were sprayed with lead arsenate in the usual manner and still others were left unsprayed and observed as checks.

No injury to trees or foliage, or premature fruit drop attributable to the oil spray application was observed. Lead arsenate caused a limited amount of early leaf fall, etc. No difference was observed in the size, color, or development of fruit harvested from treated trees and controls, the total crop being substantially the same in all instances. The degree of codling moth control was determined by actual apple count and inspection of the total crop. Control trees yielded 49.0 per cent wormy apples as against 1.0 per cent for lead arsenate treated trees and 2.2 per cent for fruit harvested from those trees treated with the emulsified oil-toxic solution.

Example V 0.5 pound of 2.4-dinitro-6-cyclohexyl-phenol and 3.0 pounds of glyceryl oleate were dissolved in 96.5 pounds of a white mineral oil having a boiling range of 600°–752° F., a Saybolt viscosity of 83°, and an unsulphonatable residue of 100 per cent.

2.14 pounds of the above solution were diluted and vigorously mixed with 100 gallons of water to form a quick breaking suspension of oil-toxic. This was applied to Baldwin apple trees as a summer spray for the control of first and second brood codling moth. No injury to tree, foliage, or fruit resulted from this treatment. The harvested crop was found to include only 1.6 per cent of wormy apples, while 49 per cent of the fruit from the untreated control trees was attacked by codling moth larvae.

Example VI

The aphicidal values of a number of oil solutions comprising mono-substituted dinitro-phenols were determined in the laboratory.

The insects used in aphicide experimentation were adults of the species *Aphis rumicus* L. In each case tests were made on five groups of ten aphids each. When, for purposes of comparison, it was desired to obtain a toxicity value for a mono-substituted dinitrophenol alone, the said phenol was applied to the aphids in solution or suspension in water or a water-sodium caseinate solution. Solutions of mono-substituted dinitro-phenols in petroleum distillates and petroleum distillates alone were emulsified with a solution of sodium caseinate in water before application to the aphids.

Each aphid test group was placed on a disk of cotton flannel in a Petri dish and sprayed with 0.5 cubic centimeter of the previously prepared test solution or emulsion. After spraying, the aphids were transferred from the flannel to a melon leaf, nasturtium foliage, or other growing vegetation, previously mounted in a wide-mouth bottle containing a small amount of water, and allowed to stand for 24 hours. The number of dead and living aphids in each test group was then determined, the results averaged, and the percentage control calculated therefrom.

2.4-dinitro-6-cyclohexylphenol was tested as above described and found to kill only 4.0 per cent of the aphids at a concentration of 0.005 per cent by weight of toxic in water. A concentration of 2.0 per cent of the above phenol was required to effect a kill of 70 per cent of the test insects.

1.6 grams of 2.4-dinitro-6-cyclohexyl phenol were then dissolved in 100 grams of white petroleum oil having an unsulphonatable residue of 97.5 per cent and a Saybolt viscosity of 81 seconds, and the resulting solution in emulsified form was found to kill 95.6 per cent of the test aphids when diluted to a concentration of 0.25 per cent of the oil and 0.004 per cent of the phenolic derivative in the applied solution.

It was found that the similarly emulsified white petroleum oil when tested at a concentration of 0.25 per cent gave only 16 per cent control of the aphids.

From the above results it was found that a combination of oil and 2.4-dinitro-6-cyclohexyl-phenol was approximately 5 times as toxic to aphids as would have been expected from the sum of the individual toxicities of the oil and the nitrophenol.

The aphicidal results obtained by a similar method for certain nitrophenols in oil, representative of the large field of materials tested, are given in the following table:

| Compound tested | Percent distillate-toxic solution in the diluted spray tested | Percent toxic in the distillate-toxic solution | Percent aphids killed |
|---|---|---|---|
| 2.4-dinitro-6-cyclohexyl phenol | 0.5 | 0.1 | 100.0 |
| 2.4-dinitro-meta-cyclohexyl phenol | 0.5 | 0.1 | 97.5 |
| 2.4-dinitro-3'-methyl-6-cyclohexyl phenol | 0.5 | 0.1 | 81.5 |
| 2.4-dinitro-6-benzyl phenol | 0.5 | 0.1 | 68.0 |
| White petroleum oil, unsulphonatable residue 97.5% | 0.25 | 0.0 | 16.0 |
| Semi-refined oil, unsulphonatable residue 77% | 0.5 | 0.0 | 44.5 |

The petroleum distillate used as a solvent in testing the above-listed mono-substituted dinitrophenols was a semi-refined oil having an unsulphonatable residue of 77%, a Saybolt viscosity of 76°, and a boiling range of 560°–760° F.

Example VII

Tests were carried out on a large number of mono-substituted dinitrophenol-petroleum distillate solutions to determine their efficiency as larvicides. Small Jonathan apples of uniform size and of a good grade were used in making the tests. Newly hatched codling moth larvae were obtained by the method of Farrar and Flint (Farrar and Flint, "Rearing codling moth larvae throughout the year"—Jr. Econ. Ent. 23:41–44, 1930). The mono-substituted dinitrophenol to be tested was dissolved in the desired petroleum distillate and the resultant solution was then emulsified with sodium caseinate and water. The Jonathan apples were thoroughly washed and the stem and calyx cavities were sealed with paraffin to prevent the entrance of larvae through these vulnerable zones. Each apple was sprayed by means of an atomizer with 10 c. c. of the previously diluted test emulsion, after which it was stored under laboratory conditions for 24 hours before being infested with 10 newly-hatched codling moth larvae. Control tests were made in which the apples were sprayed with emulsified petroleum distillate alone before infestation.

Immediately upon transference of the larvae to the apples, the latter were placed in a constant temperature container at 28.5° C. and 70 per cent relative humidity for two days. The apples were then removed from the container and stored under laboratory conditions for five days, after which the number of stings and entries in each apple was recorded. An attack by the larvae upon the surface of the apple was considered a sting if the larva had penetrated less than one-quarter of an inch into the apple and was not found to be living. The injury was considered an entry if the live larva was found or the hole was more than a quarter of an inch in depth.

One method employed for calculation of results is that suggested by the Insecticide and Fungicide Board of the United States Bureau of Entomology. This method considers the percentage of living insects in both the control and test determinations. For example, let X equal the average percentage of larvae left alive in the control determinations, which in the case of these codling moth larvae experiments is represented by the number of entries in the fruit sprayed with the emulsified petroleum distillate at a dilution of 1–80 by weight in water. Let Y equal the average percentage of larvae left alive in the test determinations, which in the case of these codling moth larvae experiments is represented by the number of entries in the fruit sprayed with the emulsified mono-substituted dinitrophenol-petroleum distillate solution. Then $$\left(\frac{X-Y}{X}\right)100$$

equals the percent control compared to petroleum distillate as zero.

0.1 gram of 2.4-dinitro-6-cyclohexyl-phenol was dissolved in 100 grams of a lubricating oil having an unsulphonatable residue of 77 per cent and a Saybolt viscosity of 76 seconds. The resulting solution, emulsified with sodium caseinate and sufficient water to give a 1.25 per cent solution of oil in the final mixture, was found to give an 80 per cent control of codling moth larvae, as compared to the emulsified lubricating oil as zero. The following table gives a summation of the test data obtained for several representative mono-substituted dinitrophenols in petroleum distillate, and lead arsenate.

| Compound tested | Percent distillate-toxic solution in the diluted spray as tested | Percent toxic in the distillate-toxic solution | Percent toxic in spray as applied | Average number of entries per apple | Net control compared to petroleum oil as zero |
|---|---|---|---|---|---|
| 2.4-dinitro-6-cyclohexyl-phenol | 1.25 | 0.1 | 0.00125 | 0.53 | 80 |
| 2.4-dinitro-6-cyclohexyl-phenol | 0.125 | 1.0 | 0.00125 | 5.00 | 23 |
| 2.4-dinitro-6-tertiary-butyl-phenol | 1.25 | 0.1 | 0.00125 | ------- | 61.5 |
| 2.4-dinitro-6-beta-phenyl-ethyl-phenol | 1.25 | 0.1 | 0.00125 | ------- | 42.3 |
| Lead arsenate 2#/50 gal | ------- | ------- | 0.5 | 1.0 | 64 |
| Lubricating oil, unsulphonatable residue 77%, Saybolt viscosity 76° | 1.25 | ------- | ------- | 2.8 | 0 |
| Lubricating oil, unsulphonatable residue 77%, Saybolt viscosity 76° | 0.125 | ------- | ------- | 6.5 | 0 |

The petroleum oil used in the preparation of the distillate-toxic test solutions was a lubricating oil type having an unsulphonatable residue of 77 per cent, a Saybolt viscosity of 76°, and a boiling range of 560°–760° F.

It was not possible to obtain accurate data concerning the larvicidal toxicity of the nitrophenols alone against codling moth. Application of the nitrophenols in admixture with various spreads and sticking agents indicated that control could be obtained with high concentrations of the same. There was a tendency, however, toward discoloration and injury of the fruit. Such undesirable effect was avoided by use of the petroleum distillate-toxic solutions due to the lower concentrations of toxic principle giving effective control.

A solution of the above-described lubricating oil containing 1.0 per cent of 2.4-dinitro-6-cyclohexyl-phenol was emulsified with a sodium caseinate-water solution, and tested at a concentration of 0.125 per cent against codling moth larvae. A control run was made using a straight oil emulsion applied at a 0.125 per cent oil content. A comparison of the resulting data showed that reduction in the quantity of oil solution applied greatly reduced the effectiveness of the petroleum distillate-toxic solution, regardless of the fact that the concentration of mono-substituted dinitrophenol in the applied spray mixture was constant. This result is indicative of the limited effectiveness of the mono-substituted dinitrophenols as the amount of petroleum distillate combined therewith is reduced. Their effectiveness as larvicides in the absence of oil is comparatively very low.

Petroleum distillates and distillate solutions containing dissolved toxic materials penetrate insect eggs and exert a toxic effect on the developing embryos. In determining the ovicidal values of petroleum distillate solutions of the various mono-substituted dinitrophenols, the eggs of *Lygaeus kalmii* Stal. were used exclusively. The eggs were collected from the oviposition cages every day and were used in the experiments within 24 hours after removal. The mono-substituted dinitrophenol to be tested was dissolved in the desired petroleum distillate and emulsified with a solution of sodium caseinate in water. A control emulsion was prepared by omitting the phenolic constituent from the petroleum distillate-caseinate-water emulsion. The petroleum distillate used in this type of determination was a lubricating oil having a Saybolt viscosity of 99–100 seconds, a boiling range of 606° to 742° F., and an unsulphonatable residue of 82 per cent.

Eggs oviposited over a 24-hour period were thoroughly mixed to insure homogeneous sampling and sample lots of 50 were transferred to Petri dishes containing moistened filter paper. The eggs were scattered evenly over the center of the filter paper, particular care being taken to prevent any of the eggs remaining in contact with one another. This was rather an important point since when several eggs were grouped in contact with each other the test-spray materials clung between the eggs and inconsistent results were obtained.

Each Petri dish containing eggs was sprayed with 2.5 cubic centimeters of the diluted emulsion, the excess spray liquid drained off, the exposed glass of the dish wiped clean with a towel, and the dish stored in an incubator maintained at a constant temperature of 30° C. and a relative humidity of about 85 per cent. The eggs were allowed to remain under these conditions for a period of six days.

Following the incubation period, examination of the eggs sprayed with the diluted emulsions showed that the embryos had died at various stages in their development. This was evidenced by the color of the eggs. Some of the eggs were white, thus showing that the embryos died soon after the eggs were sprayed; some were yellow, indicating that the embryo developed for some time before succumbing to the toxic effects of the spray; while others were bright orange in color, and should have hatched had not the embryos been so weakened by the toxic materials that they were not strong enough to break through the chorion. Some of the fully developed embryos managed to break through the egg shell but died almost immediately following the hatching phenomenon.

In calculating the average per cent mortalities, the number of larvae that died immediately after hatching and the numbers of eggs that failed to hatch were added together. For example, of the 250 eggs used in determining the ovicidal effect of the petroleum distillate control emulsion at 1 per cent, 21 eggs failed to hatch and 5 other eggs hatched but the young larvae died immediately after hatching. The distillate was, therefore, effective on 26 eggs out of 250, and gave an average per cent mortality of 10.4.

Net mortalities as compared with control were calculated by the following method:

Where X equals the percentage of eggs that hatched in the group treated with the phenol-free distillate emulsion, and Y equals the percentage of eggs that hatched in the group treated with distillate plus the mono-substituted dinitrophenols, $$\left(\frac{X-Y}{X}\right)100$$

equals the net mortality as compared with control as zero.

Illustrative of the type of mono-substituted dinitrophenol tested and the results obtained is the following example:

*Example VIII*

1.0 gram of 2.4-dinitro-6-cyclohexyl-phenol was dissolved in 100 grams of the previously described lubricating oil and a portion of this solution emulsified with sodium caseinate and sufficient water to form a 1.0 per cent concentration of oil-toxic solution in the final mixture. This was tested as described above and found to kill 60.3 per cent of the eggs treated. Since the oil alone kills 10.4 per cent of treated eggs, the net mortality as compared to such oil is 55.6. A water solution containing 0.01 per cent 2.4-dinitro-6-cyclohexyl-phenol gave less than 5 per cent average kill of treated eggs. The oil-2.4-dinitro-6-cyclohexyl-phenol combination is therefore substantially 4 times as toxic as might have been anticipated from the toxicities of its components.

A 2.0 per cent emulsion of the above-prepared oil-2.4-dinitro-6-cyclohexyl phenol solution when tested gave an average kill of 94.2 per cent of the eggs treated. Since 2.0 per cent of the control emulsion gave a kill of 40.0 per cent, the net mortality of the oil-toxic solution as compared with the petroleum oil is 90.3. 0.02 per cent of 2.4-dinitro-6-cyclohexyl phenol in water was found to give less than 5.0 per cent average kill of treated eggs. The oil-toxic solution was therefore more than twice as effective as might have been anticipated from a consideration of the constituents of such solution.

*Example IX*

Varying concentrations of representative mono-substituted dinitrophenols were dissolved in petroleum distillates, emulsified with a suitable agent, e. g., sodium caseinate and water, blood albumin, etc., and applied to apple foliage in amounts suitable for pest control. Inspection at regular intervals over a period of several weeks failed to disclose any appreciable foliage burning or other injury to the sprayed trees. In this series of experiments the amounts of included distillates having unsulphonatable residues between 77 and 83 per cent varied from about 0.625 to 2.5 per cent by weight of the applied spray composition. The tested mono-substituted dinitrophenols were present in concentrations between about 0.0009 and 0.0186 per cent by weight of the total spray mixtures.

The petroleum distillates themselves, at concentrations of 4 to 5 per cent by weight of the applied spray mixtures, gave some pest control, but caused severe defoliation of the trees and retardation of their normal development.

The mono-substituted dinitrophenols, alone, were found to cause foliage burn at concentrations as low as 0.03 per cent by weight in water. This burning action was undoubtedly accelerated by small amounts of calcium salts in the water employed, which had a tendency to react with the mono-substituted dinitrophenols to form the corresponding calcium phenolates which are notoriously severe in their burning action. This injury to foliage on the part of the free mono-substituted dinitrophenols was substantiated by experimental data obtained in laboratory treatment of cineraria foliage. On this extremely sensitive plant certain of the mono-substituted nitrophenols burned at concentrations as low as 0.003 per cent in water. This characteristic of the mono-substituted dinitrophenols constituted an apparently insurmountable obstacle to their use alone as insecticidal materials.

*Example X*

The comparative toxicity of the nitrophenols has been widely investigated during recent years and the results so obtained have indicated this class of compounds to be relatively non-toxic as compared to most inorganic insecticides containing lead, arsenic, mercury, cyanide, etc., at present used for pest control. The use of many of these toxic inorganic materials as insecticides necessitates the removal of undesirable spray residues before marketing fruit so treated. The use of oil sprays comprising nitrophenols substantially eliminates the step of residue removal.

As an example of the comparatively non-poisonous character of the mono-substituted dinitrophenols, the following test on dinitro-ortho-cyclohexyl-phenol is presented.

A female dog, weighing 12.21 kilograms, was fed a total of 30 grams of dinitro-orthocyclohexyl-phenol over a period of 12 days. The nitrophenol was administered orally in 5.0 gram lots every two days during the test period. No ill effects such as loss of weight, metabolic disturbances, etc., were reported during the period of feeding or at any time following the completion of the test. The amount of the phenol derivative consumed by the test animal was 2.45 grams per kilogram of weight and indicates the comparative lack of toxicity shown by these materials to domestic animals. Their toxicity to human beings can only be inferred from the above results, but, in the light of comparative experiments performed on other materials suspected of being poisonous in character, the toxicity of this type of compound to test animals such as dogs may be taken as a substantially accurate index of toxicity to man.

I have shown by the preceding examples some of the ways in which my invention may be applied, and have given a résumé of the manner in which these new insecticidal compositions have been tested in determining the efficiency, toxicities, and economic superiority of the same as compared to known insecticidal agents comprising petroleum distillate. The advantages accruing to the use of these new insecticides include (1) their increased toxicity to insect life at low concentrations; (2) the absence of plant injury resulting from their application in concentrations suitable for pest control; (3) the use therein of comparatively inexpensive, partially refined petroleum distillates; (4) their substantial non-toxicity to domestic animals and man; (5) and the low comparative cost of insect control possible through their use.

Other modes of applying the principle of my invention may be employed instead of those explained, change being made as regards the materials or their amounts employed, provided the ingredients stated by any of the following claims or their equivalent be employed.

I therefore particularly point out and distinctly claim as my invention:—

1. A composition of matter adapted to be incorporated in an aqueous emulsion suitable for application as insecticide to living plants, comprising a petroleum distillate having an unsulphonatable residue of at least 50 per cent by weight, and up to about 10 per cent by weight of a 2,4-dinitro-phenol compound substituted in the benzene ring by a hydrocarbon radical containing at least two carbon atoms selected from the class consisting of the alkyl, aralkyl, and cycloalkyl radicals.

2. A composition of matter adapted to be incorporated in an aqueous emulsion suitable for application as an insecticide to living plants, comprising a petroleum distillate having an unsulphonatable residue of at least 50 per cent by weight, up to about 10 per cent by weight of a 2,4-dinitro-phenol compound substituted in the benzene ring by a hydrocarbon radical containing at least two carbon atoms selected from the class consisting of the alkyl, aralkyl, and cycloalkyl radicals, and an emulsifying agent compatible therewith and non-reactive with the phenol.

3. An aqueous insecticidal emulsion suitable for application to living plants comprising up to about 5 per cent of an oil having an unsulphonatable residue of at least 50 per cent by weight and up to about 0.5 per cent by weight of a 2,4-dinitro-phenol compound substituted in the benzene ring by a hydrocarbon radical containing at least two carbon atoms selected from the class consisting of the alkyl, aralkyl, and cycloalkyl radicals.

4. An aqueous insecticidal emulsion suitable for application to living plants, comprising:

| | Percent by weight |
|---|---|
| A petroleum distillate containing at least 50 percent by weight of unsulphonatable residue | 0.10 – 5.0 |
| A 2,4-dinitro-phenol compound substituted in the benzene ring by a hydrocarbon radical containing at least 2 carbon atoms selected from the class consisting of the alkyl, aralkyl, and cycloalkyl radicals | 0.001– 0.2 |
| An emulsifying agent compatible with the other constituents of the composition and nonreactive with the phenol compound | 0.005– 0.8 |
| Water | 99.894– 94.0 |
| | 100.000 100.0 |

5. A composition of matter adapted to be incorporated in an aqueous emulsion suitable for application as an insecticide to living plants, comprising a petroleum distillate having an unsulphonatable residue of at least 50 per cent and up to about 10 per cent by weight of 2,4-dinitro-6-cyclohexyl phenol.

6. An aqueous insecticidal emulsion suitable for application to living plants, comprising up to about 5 per cent of an oil having an unsulphonatable residue of at least 50 per cent by weight and up to about 0.5 percent of 2,4-dinitro-6-cyclohexyl phenol.

7. An aqueous insecticidal emulsion suitable for application to living plants, comprising:

| | Percent by weight |
|---|---|
| A petroleum distillate containing at least 50 percent by weight of unsulphonatable residue | 0.10 – 5.0 |
| 2,4-dinitro-6-cyclohexyl-phenol | 0.001– 0.2 |
| An emulsifying agent compatible with the other constituents of the composition and nonreactive with the phenol compound | 0.005– 0.8 |
| Water | 99.894– 94.0 |
| | 100.000 100.0 |

8. A composition of matter adapted to be incorporated in an aqueous emulsion suitable for application as an insecticide to living plants, comprising a petroleum distillate having an unsulphonatable residue of at least 50 per cent by weight and up to about 10 per cent by weight of 2,4-dinitro-meta-cyclohexyl phenol.

LINDLEY E. MILLS.